United States Patent [19]

Suzuki

[11] Patent Number: 5,109,516
[45] Date of Patent: Apr. 28, 1992

[54] SEQUENCE CONTROLLER FOR CONTROLLING NEXT OPERATING STATE WITH A SHORT SEQUENCE

[75] Inventor: Nariko Suzuki, Tokyo, Japan
[73] Assignee: NEC Corporation, Tokyo, Japan
[21] Appl. No.: 309,409
[22] Filed: Feb. 13, 1989
[30] Foreign Application Priority Data
Feb. 12, 1988 [JP] Japan .................. 63-31076
[51] Int. Cl.⁵ .......................... G06F 09/00
[52] U.S. Cl. .................. 395/775; 364/DIG. 1; 364/359.9; 364/271.6; 364/264.5
[58] Field of Search ... 364/200 MS File, 900 MS File
[56] References Cited
U.S. PATENT DOCUMENTS

4,179,737 12/1979 Kim ............................. 364/200
4,197,589 4/1980 Cornish et al. .................. 364/900
4,752,909 6/1988 Fujiwara et asl. ............... 364/900

*Primary Examiner*—Eddie P. Chan
*Attorney, Agent, or Firm*—Foley & Lardner

[57] ABSTRACT

A sequence controller for designating an operating state to be performed currently, includes a set of terminals from which first data for designating a current operating state is derived, a state designation circuit producing second data for designating a next operating state in response to said first data, a latch circuit coupled between the state designation circuit and the set of terminals for latching and outputting the second data instead of the first data in response to a strobe signal, and a signal generator supplied with a clock signal for producing the strobe signal in synchronism with the clock signal when a response signal to the current operating state is returned to the controller.

5 Claims, 6 Drawing Sheets

SEQUENCE CONTROLLER FOR CONTROLLING NEXT OPERATING STATE WITH A SHORT SEQUENCE

BACKGROUND OF THE INVENTION

1. Field of the Invention

The present invention relates to a sequence controller for controlling a sequence of operating states of a data processor and, more particularly, to a controller for designating a next operating state by a response signal to a current operating state.

2. Description of the Related Arts

Such a sequence controller may be employed in, for example, an instruction decoder unit of a microprocessor. More specifically, the microprocessor includes a bus control unit for controlling a bus coupled to a memory to write or read data into or from the memory, an instruction prefetch unit coupled to the bus control unit for prefetching instructions from the memory by use of the bus control unit, an effective address generator coupled to the bus control unit for supplying an effective address used for a memory access operation, an execution unit executing each instruction, and an instruction decoder unit coupled to the prefetch unit, the effective address generator and the execution unit. The decoder unit requests the prefetch unit to output the instruction therefrom. If the prefetch unit has the prefetched instruction, it returns a prefetch ready signal to the decoder unit and concurrently supplies the instruction to the decoder unit. The decoder unit responds to the prefetch ready signal and receives the instruction from the prefetch unit to decode it. In general, the instruction has an operation code field for designating an operation to be executed by the execution unit and at least one operand addressing field for designating the address of operand data to be processed. The decoded output of the operation code field is therefore supplied to the execution unit. On the other hand, in the case where the operand addressing field is decoded to designate a memory address, the decoder unit requests the effective address generator to calculate the effective address of the operand data. If the effective address generator is free, it returns an address calculation ready signal to the decoder unit and starts to calculate the effective address of the operand data. The calculated effective address is supplied to the bus control unit. In response to the address calculation ready signal, on the other hand, the decoder unit changes to an initial operating state to request the prefetch unit to output a next instruction.

Thus, the instruction decoder unit operates according to a predetermined state sequence. In order to control the operating sequence of the decoder unit, a sequence controller is provided, which includes a state designation circuit for designating the current operating state to be performed. It should be noted, however, that the current operating state has to be maintained until the response signal to the current operating state, i.e. the prefetch ready signal or the address calculation ready signal, is returned to the sequence controller. For this purpose, according to the above prototype sequence controller, the output of the state designation circuit is latched by a latch circuit in synchronism with a first clock signal, the output of the latch circuit being used for designating the current operating state, and the response signal to the current operating state is sampled in synchronism with a second clock signal having a phase opposite to that of the first clock signal. The sampled result is supplied to the state designation circuit together with the output of the latch circuit. When the response signal is not returned, the state designation circuit designates the same operating state, so that the output of the latch circuit is not changed.

However, the sampling of the response signal is carried out in synchronism with the second clock signal, i.e., in synchronism with the end of a half clock of the first clock signal. It is very difficult to synchronize the operations of the prefetch unit and the effective address unit, because they operate at a very high speed to return the ready signal to the decoder unit within the period corresponding to the half clock of the first clock signal. In fact, they return the ready signal to the decoder unit after the half clock of the first clock signal. For this reason, the same operating state is designated during at least two clock periods of the first clock signal even when the prefetch unit and the effective address generator return the ready signal to the decoder unit immediately in response to the request from the decoder unit. As a result, the data processing speed of the microprocessor cannot be made faster.

SUMMARY OF THE INVENTION

Therefore, an object of the present invention is to provide an improved sequence controller.

Another object of the present invention is to provide a sequence controller which can shift an operating state to be designated in a short clock period of a predetermined clock signal.

Still another object of the present invention is to provide a microprocessor including an instruction decoder unit equipped with a sequence controller which can enhance the processing speed of the microprocessor.

A sequence controller according to the present invention comprises a set of output terminals from which first data designating a current operating state is derived, a state designation circuit coupled to the set of output terminals to receive the first data and to generate second data designating a next operating state, a latch circuit coupled between the state designation circuit and the set of output terminals for latching the second data from the state designation circuit in response to a strobe signal and for supplying the latched data to the set of output terminals as first data, and a strobe signal generator receiving a clock signal to generate the strobe signal in synchronism with the clock signal when a response signal to the current operating state is supplied thereto.

The state designation circuit designates the next operation state irrespective of the response signal to the current operating state, and the latch circuit latches the output from the state designation circuit in response to the strobe signal which is generated in synchronism with the clock signal when the response signal to the current operating state is returned thereto. The designation of the next operating state is thereby determined by whether or not the response signal is returned within a period corresponding to one clock, not a half clock, of the clock signal. Accordingly, even when the response signal is returned after a half clock of the clock signal, the operating state to be designated can be shifted in one clock. If the response signal is not returned, the strobe signal is not generated, so that the data latched in the latch circuit is not changed. The same operating state thereby continues to be designated until the response signal is returned.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

In order to facilitate the understanding of the present invention, a description will be made of a case where a sequence controller according to the present invention is applied to an instruction decoder unit of a microprocessor.

Figure 1:
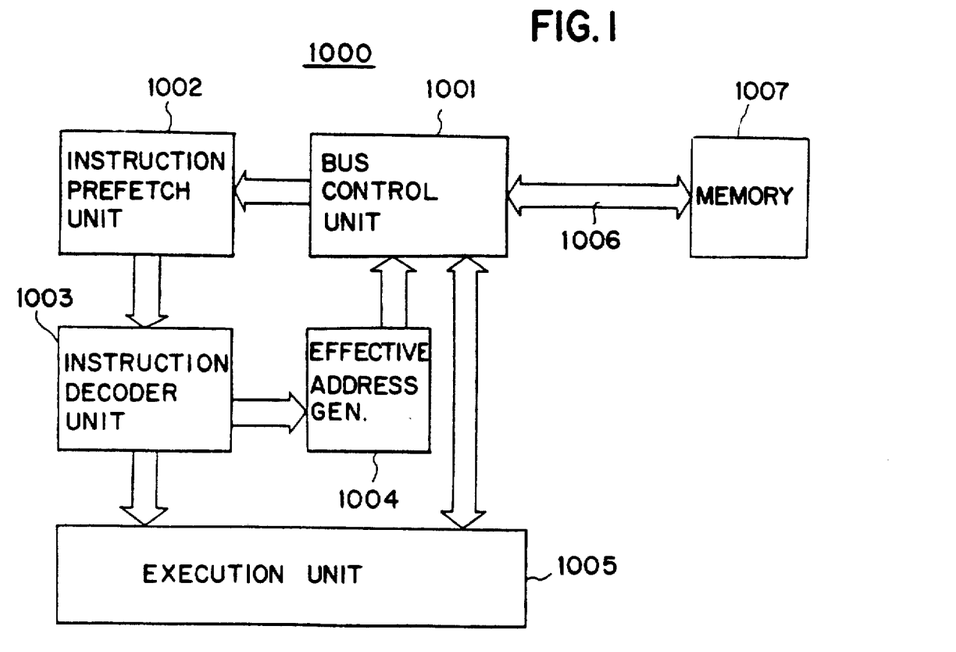
FIG. 1 is a block diagram representative of a microprocessor.

Referring to FIG. 1, a microprocessor 1000 includes a bus control unit (BCU) 1001, an instruction prefetch unit (PFU) 1002, an instruction decoder unit (IDU) 1003, an effective address generator (EAG) 1004, and an execution unit (EXU) 1005. The BCU 1001 controls a system bus 1006 to write or read data into or from a memory 1007 coupled to the bus 1006. Further coupled to the bus 1006 are a plurality of peripheral control units (not shown). The PFU 1002 prefetches instructions from the memory 1007 by use of the BCU 1001 when the bus 1006 is free from a data access operation.

Figure 9A:
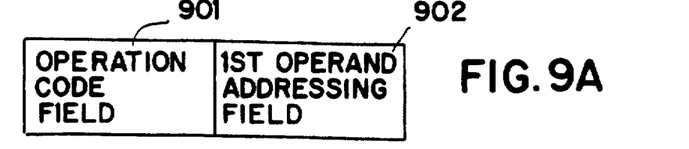
FIG. 9A is a format representative of a first type instruction and FIG. 9B is a format representative of a second type instruction.
Figure 9B:
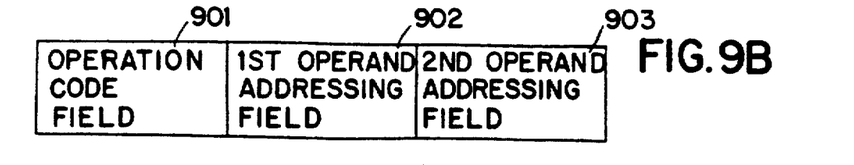

Turning to FIG. 9, there are shown two types of instructions, the first type of which is a one-operand instruction (FIG. 9A) and the second type of which is a two-operand instruction (FIG. 9B). Each of the first and second type instructions includes an operation code field 901 of one byte for designating an operation to be performed and a first operand addressing field 902 of one byte. Only the second type instruction further includes a second operand addressing field 903 of one byte. Each of the addressing fields 902 and 903 has base mode information representing that an operand to be processed is stored in the memory 1007 or register mode information representing that an operand to be processed is stored in a register provided in the EXU 1005.

Turning back to FIG. 1, the PFU 1002 supplies the instruction to the IDU 1003 in response to a request therefrom. In case where the operand addressing field 902 (903) has the base mode information, the IDU 1003 supplies the EAG with information necessary to calculate the effective address of the operand data. On the other hand, the operand addressing field 902 (903) has the register mode information and the IDU 1003 supplies that information to the EXU 1005. The IDU 1003 further supplies the EXU 1005 with information responsive to the operation code field 901 to designate an operation to be performed by the EXU 1005. The EAG 1004 calculates the effective address of the operand data in response to the information from the IDU 1003 and supplies the calculated effective address to the BCU 1001 to request memory access. The BCU 1001 accesses the memory 1007 by use of the effective address and supplies the operand data to the EXU 1005. When the EXU 1005 is prepared with all the operand data necessary to perform the designated operation, it starts to execute the instruction. Thus, the IDU 1003 is required to operate in a predetermined sequence responsive to the type of the instructions.

Figure 2:
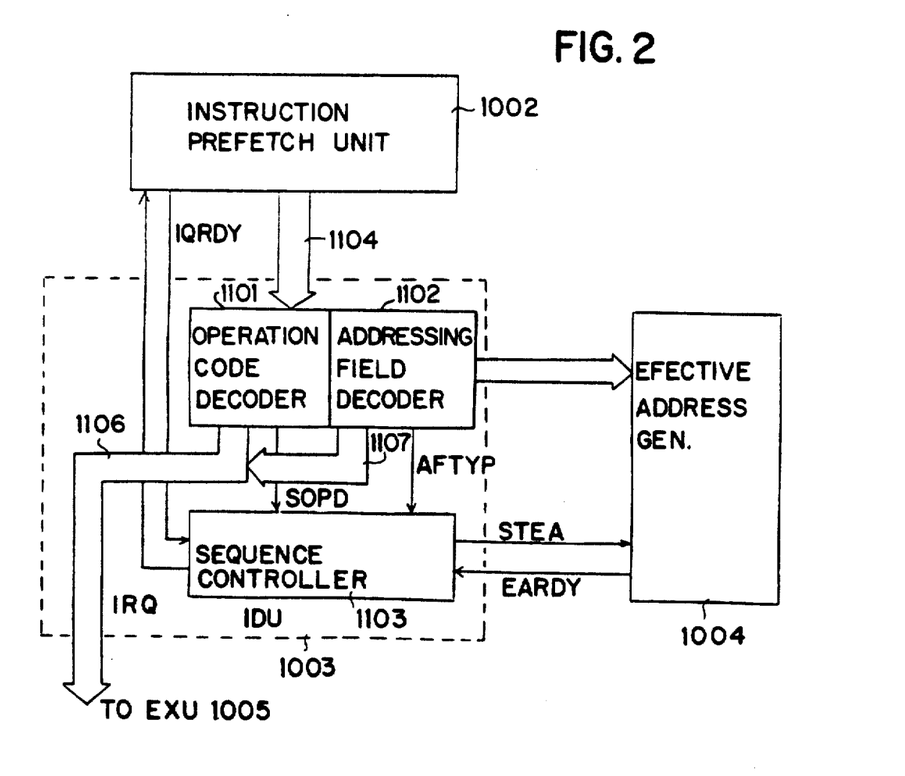
FIG. 2 is a block diagram representative of an instruction decoder unit shown in FIG. 1.

For this purpose, the IDU 1003 includes a sequence controller 1103, as shown in FIG. 2. The IDU 1003 further includes an operation code decoder 1101 and an addressing field decoder 1102. When the sequence controller 1103 is activated by, for example, the EXU 1005, it generates and supplies an instruction read request (IRQ) signal to the PFU 1002 to request a two-byte code. If the PFU 1002 has already prefetched the instruction, it returns an instruction ready (IQRDY) signal to the sequence controller 1103 and concurrently transfers the prefetched instruction to the IDU 1003 via an instruction bus 1104. Otherwise, the IDU 1003 continues to supply the IRQ signal until the IQRDY signal is returned thereto. The decoder 1101 receives the operation code field 901 of the instruction and the decoder 1102 receives the operand addressing field 902 thereof. In response to the operation code field, the decoder 1101 supplies an instruction type designation (SOPD) signal to the controller 1103 to inform it of the type of the instruction. In this description, the SOPD signal of logic "1" indicates the one-operand instruction shown in FIG. 9A, whereas the SOPD signal of logic "0" indicates the two-operand instruction shown in FIG. 9B. The decoded output of the operation code is supplied to the EXU 1105 via an internal bus 1106. In response to the operand addressing field, the decoder 1102 supplies an address mode type designation (AFTYP) signal to the controller to inform it of the type of the address mode. In this description, the AFTYP signal of logic "1" indicates the base addressing mode, whereas the AFTYP signal of logic "0" indicates the register addressing mode. In response to the AFTYP signal of logic "1", the sequence controller generates and supplies an address calculation request signal (STEA) to the EAG 1004 and controls the decoder 1102 to supply the EAG 1004 via an internal bus 1105 with the information ACD necessary to calculate the effective address of the operand data. When the EAG 1004 is not busy, it returns an address calculation ready (EARDY) signal to the sequence controller 1103. Otherwise, the IDU 1003 continues to supply the STEA signal and information ACD until the EARDY signal is returned thereto. In response to the EARDY signal, the sequence controller 1103 changes the operating state of IDU 1003 to an initial state to generate the IRQ signal. On the other hand, in the case for the logic "0" of AFTYP signal, i.e., in the case of the register addressing mode, the sequence controller 1103 controls the decoder 1102 to supply the decoded output to the EXU 1005 via a bus 1107, and then changes the operating state to the initial state. When the SOPD signal is logic "0", the IDU 1003 generates the IRQ signal to request a one-byte code from the PFU 1002. The second operand addressing field 903 of the second type instruction (FIG. 9B) is thereby outputted from the PFU 1002 and is then supplied to the decoder 1102. On the other hand, in the case where the SOPD signal is logic "1", the IDU 1003 requests a two-byte code from the PFU 1002, so that a next first type instruction (FIG. 9A) is read out of the PFU 1002.

Thus, the sequence controller 1103 includes a main sequential control circuit for controlling the operating state of the IDU 1003 in response to the number of the operand addressing fields in one instruction and a normal sequential control circuit for controlling the operating state of the IDU 1003 in response to the addressing mode designated by the operand addressing field.

Figure 3:
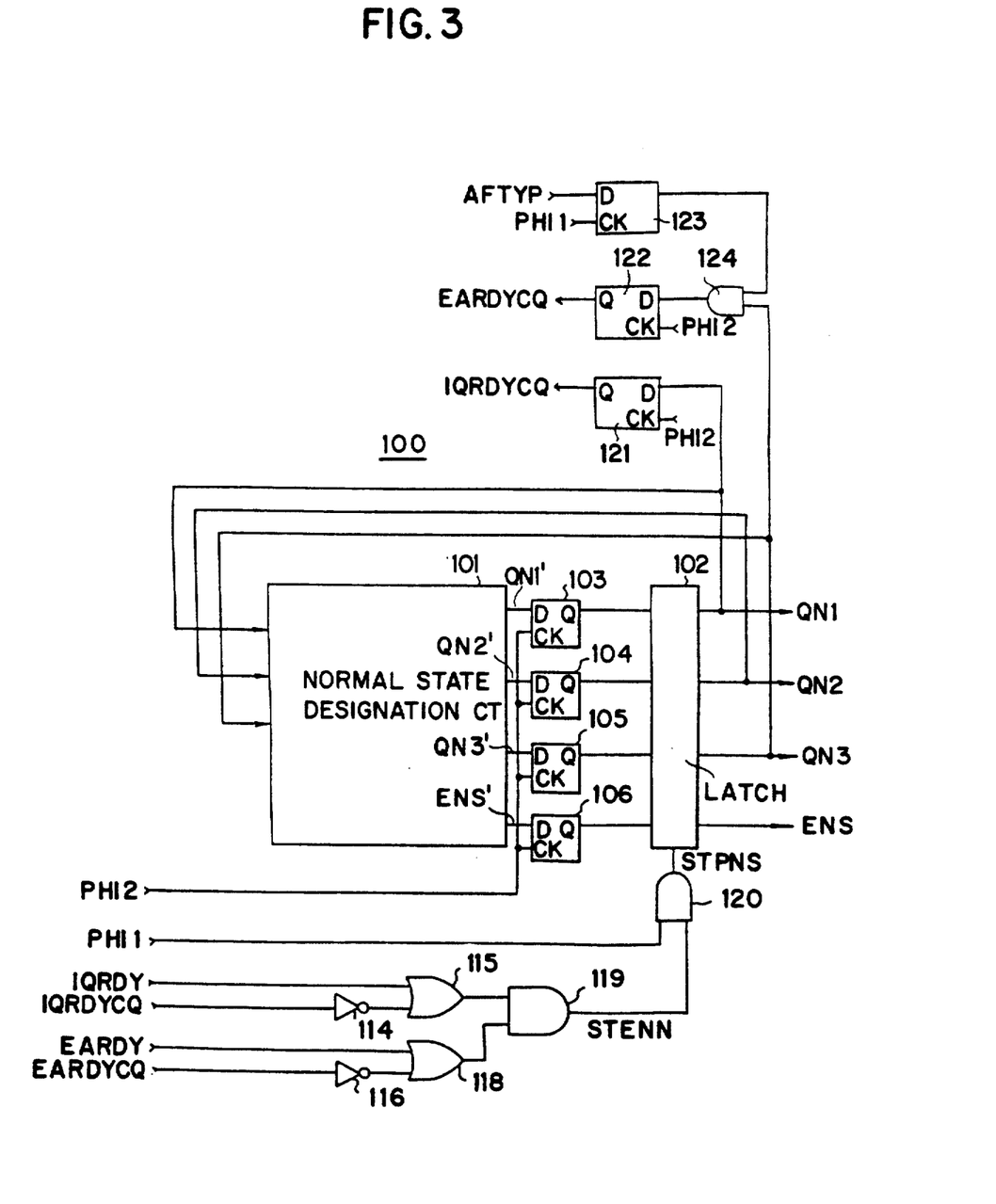
FIG. 3 is a circuit diagram representative of a normal sequential control circuit according to an embodiment of the present invention.
Figure 4:
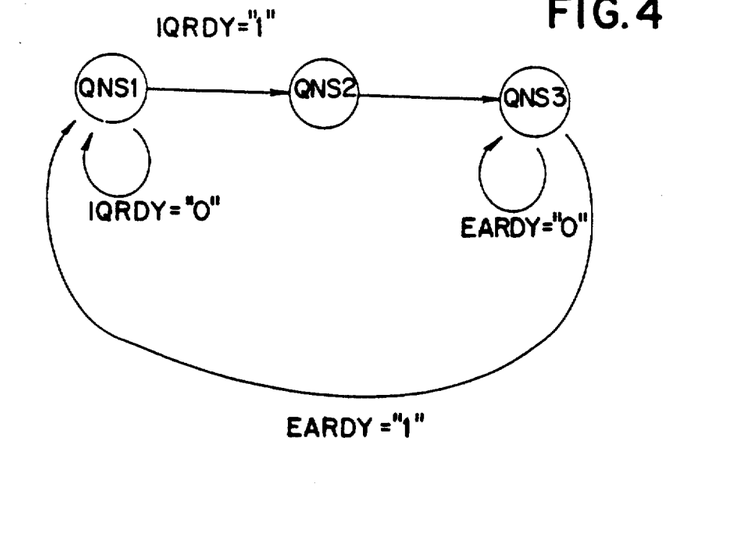
FIG. 4 is a state shifting diagram of the sequential control circuit shown in FIG. 3.

Turning to FIG. 3, the above normal sequential control circuit is denoted by reference numeral 100 and shown as an embodiment of the prevent invention. This control circuit 100 generates three operating state signals QN1, QN2 and QN3. The operating state of the IDU 1003 is shifted in accordance with the signals QN1, QN2 and QN3, as shown in FIG. 4. The state signal QN1 designates an operating state QNS1 in which the IDU 1003 generates the IRQ signal to request a two-byte or one-byte code from the PFU 1002 and waits for the IQRDY signal. When the PFU 1002 generates the IQRDY signal, i.e. when the IQRDY signal takes logic "1", the state signal QN2 is generated to designate an operating state QNS2, during which the decoding operation of the decoders 1101 and 1102 is completed. The state signal QN3 is thereafter generated to designate an operating state QNS3. In this state, when the operand addressing field 902 (903) designates the base mode (AFTYP="1"), the IDU 1003 generates a STEA signal and waits for the EARDY signal. When the EARDY signal is generated from the EAG 1004 as a logic "1", the signal QN1 is generated, so that the operating state is returned to the state QNS1. On the other hand, when the operand addressing field 902 (903) designates the register mode, the operating state is changed from QNS3 to QNS1 without waiting for the EARDY signal.

The operating state signals QN1 to QN3 are supplied to a state designation circuit 101. This circuit 101 comprises a programmable logic array (PLA), well-known in the art, and generates the next operating state signals QN1', QN2' and QN3' in response to the current operating state signal QN1 to QN3, as shown in the following TABLE-1.

TABLE 1

| Input | Output | |
|---|---|---|
| Current State | Next State | ENS' |
| QN1 | QN2' | 0 |
| QN2 | QN3' | 0 |
| QN3 | QN1' | 1 |

The circuit 101 further generates a signal ENS' which is outputted simultaneously with the state signal QNS' as shown in TABLE-1 and represents the end of one sequence in the normal sequential control circuit 100. These signals QN1', QN2', QN3' and ENS are stored respectively into type flip-flop (D-FFs) 103, 104, 105 and 106 in synchronism with the leading edge of a second clock signal PHI2 which has a phase opposite to that of the first clock signal PHI1. The outputs of the D-FFs 103 to 106 are supplied to a latch circuit 102 which receives a strobe signal STPNS as a latch-enable clock. That is, the latch circuit 102 latches the outputs of the D-FFs 103 to 106 in synchronism with the leading edge of the strobe signal STPNS, and the data latched in the circuit 102 are outputted as the current operating state signals QN1 to QN3 and the one-sequence end signal ENS.

The strobe signal STPNS is produced by an AND gate 120 having a first input supplied with the first clock signal PHI1 and a second input supplied with the output STEN of an AND gate 119. This gate 119 receives the outputs of two OR gates 115 and 118. The OR gate 115 has a first input supplied with the IQRDY signal from the PFU 1002 and a second input supplied via an inverter 114 with an instruction ready check (IQRDYCQ) signal. This IQRDYCQ signal is generated by a D-FF 121 storing the state signal QN1 in synchronism with the leading edge of the second clock signal PHI2 and is thus used for waiting for the IQRDY signal in the state QNS1. The OR gate 118 has a first input supplied with the EARDY signal from the FAG 1004 and a second input supplied via an inverter 116 with an address calculation ready check (EARDYCQ) signal. This EARDYCQ signal is produced by a D-FF 122 having a data input supplied with the output AND gate 124 and a clock input supplied with the second clock signal PHI2. The AND gate 124 supplied with the state signal QN3 and the output of a D-FF 123 having a data input supplied with the AFTYP signal and a clock input supplied with the first clock signal PHI1. Therefore, when the base mode is designated (AFTYP="1"), the EARDYCQ signal is used for waiting for the EARDY signal in the state QNSY. When the register mode is designated (AFTYP="0"), the EARDYCQ signal is held at the logic "0" to invalidate the EARDY signal.

Figure 5:
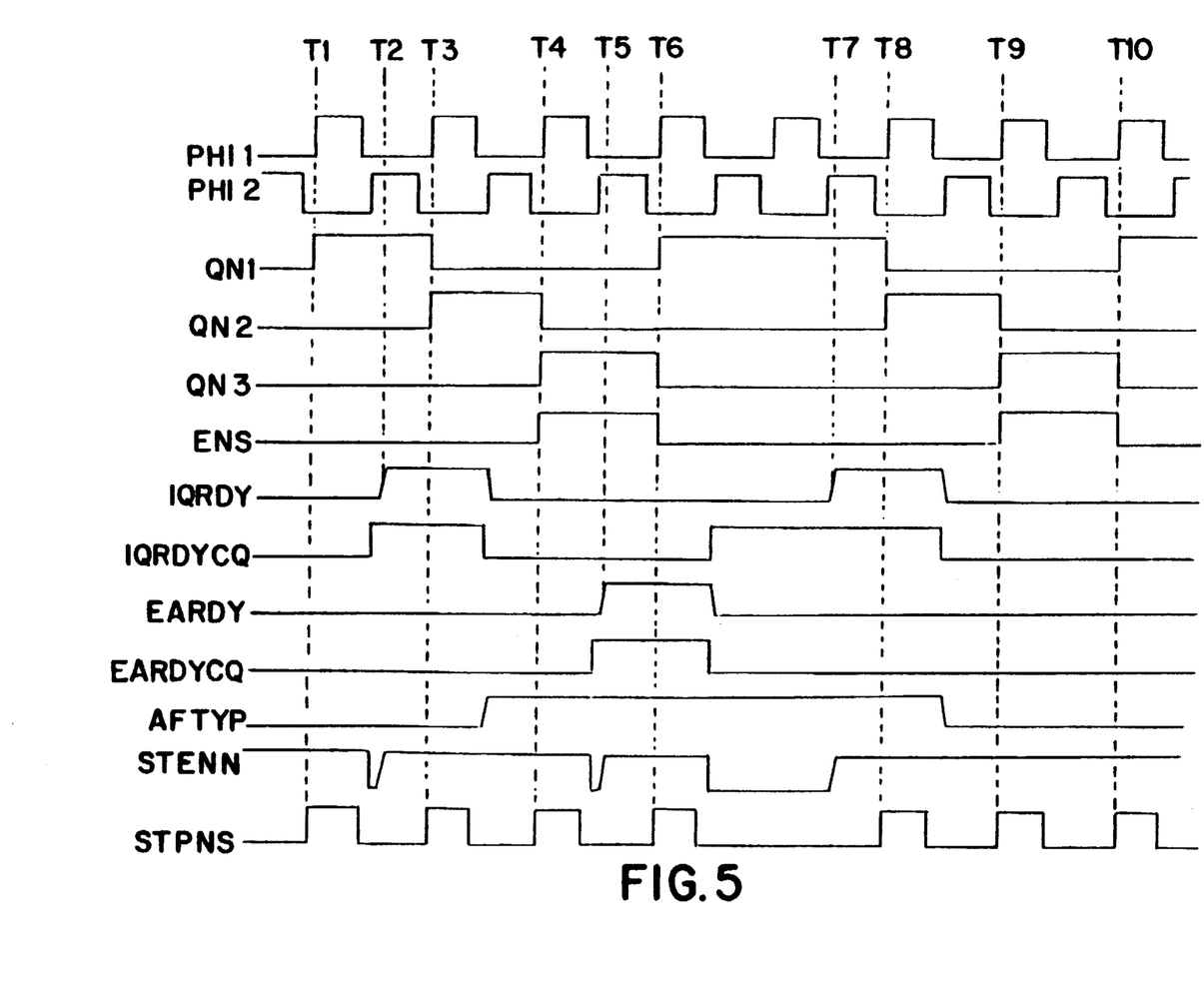
FIG. 5 is a timing chart representative of an operation of the sequential control circuit shown in FIG. 3.

The operation of the normal sequential control circuit 100 will be described below with reference to the timing chart shown in FIG. 5. When the IDU 1003 is activated by the power-on or a request from the EXU 1005, the latch circuit 102 is preset in synchronism with the leading edge of the first clock signal PHI1 to output the state signal QN1 at a time T1. The state QNST is thereby designated to request a two-byte or one-byte code from the PFU 1002. Assuming that the PFU 1002 has already prefetched the instruction, it returns the IQRDY signal to the IDU 1003. However, as already mentioned hereinbefore, the PFU 1002 cannot return the IQRDY signal during a half clock period of the first clock signal PHI1, but returns it at a time T2 after the half clock period. On the other hand, the state designation circuit 101 generates the state signal QN2' in response to the current state signal QN1, and the signal QN2' is stored in the D-FF 104 in response to the second clock signal PHI2. With the IQRDY signal present, the OR gate 115 produces logic "1", and at this time, the OR gate 118 also produces logic "1" due to the logic "0" of the EARDYCQ signal. The output STENN of the AND gate 119 thereby takes a logic "1" state. As a result, the strobe signal STPNS is generated in synchronism with the next leading edge of the first clock signal PHI1 (time T3). The state signal QN1 thereby disappears and the state signal QN2 is in turn generated to designate the state QNS2. Thus, the state QNS1 is completed during one clock period of PHI1, when the PFU 1002 returns the IQRDY signal to the IDU 1003 in response immediately to the request therefrom. In the state QNS2, the code from the PFU 1002 is decoded by the decorders 1101 and 1102. In response to the signal QN2, the circuit generates the state signal QN3' and the one-sequence end signal ENS' which are in turn stored in the D-FFs 105 and 106 by the second clock PHI2. Assuming that the base addressing mode is designated, the AFTYP is changed to logic "1". At a time $T_4$, the state signal QN3' is latched by the latch circuit 102 to designate the state QNS3 as a current state. Accordingly, the IDU 1003 produce the STEA signal to request effective address calculation from the EAG 1004. Assuming that the EAG 1004 is not busy, it returns the EARDY signal to the IDU 1003. As also mentioned hereinbefore, however, the EAG 1004 cannot return the EARDY signal within a half clock period of the first clock signal PHI, but returns it at a time $T_5$. Using the EARDY signal, the OR gate 118 produces logic "1", and the OR gate 115 is already producing logic "1". On the other hand, the circuit 101 generates the state signal QN1' in response to the current state signal QN3. Therefore, the latch circuit 102 latches the signal QN1' at a time $T_6$, so that the state signal QN3 disappears and the state signal QN1 is in turn generated. Thus, the state QNS3 is completed during one clock period of PHI1, if the EAG 1004 is not busy.

Since the state QNS1 is designated at a time $T_6$, the IDU 1003 requests another two-byte or one-byte code from the PFU 1002 and waits for the IQRDY signal. In response to the generation of the IQRDY signal at a time $T_7$, the state signal QN2 is generated to designate the state QNS2 at a time $T_8$. Assuming that the register addressing mode is designated, the AFTYP signal is changed to a logic "0". At a time $T_9$, the state QNS3 is designated. Since the AFTYP signal is logic "0", the EARDYCQ signal is held at logic "0". The EARDY signal is thereby ignored, so that the operating state of the IDU 1003 is changed to the state QNS1 at a time $T_{10}$.

Thus, the normal sequential control circuit 100 can shift the operating state of the IDU in one clock cycle of the first clock signal PHI1 when the PFU 1002 has already prefetched the instructions and the EAG 1004 is not busy, and moreover can continue to designate the current operating state until the response signal, IQRDY or EARDY, to the current operating state is returned to the IDU 1003.

In FIG. 3, when the state designation circuit 101 comprises a static type PLA, the D-FFs 103 to 106 may be omitted. On the other hand, in the case of employing a dynamic type PLA circuit 101, the circuit 101 is precharged during the high level period of the second clock signal PHI2 and generates the state signal during the high level period of the first clock signal PHI1, and therefore the D-FFs 103 to 106 are required.

Figure 6:
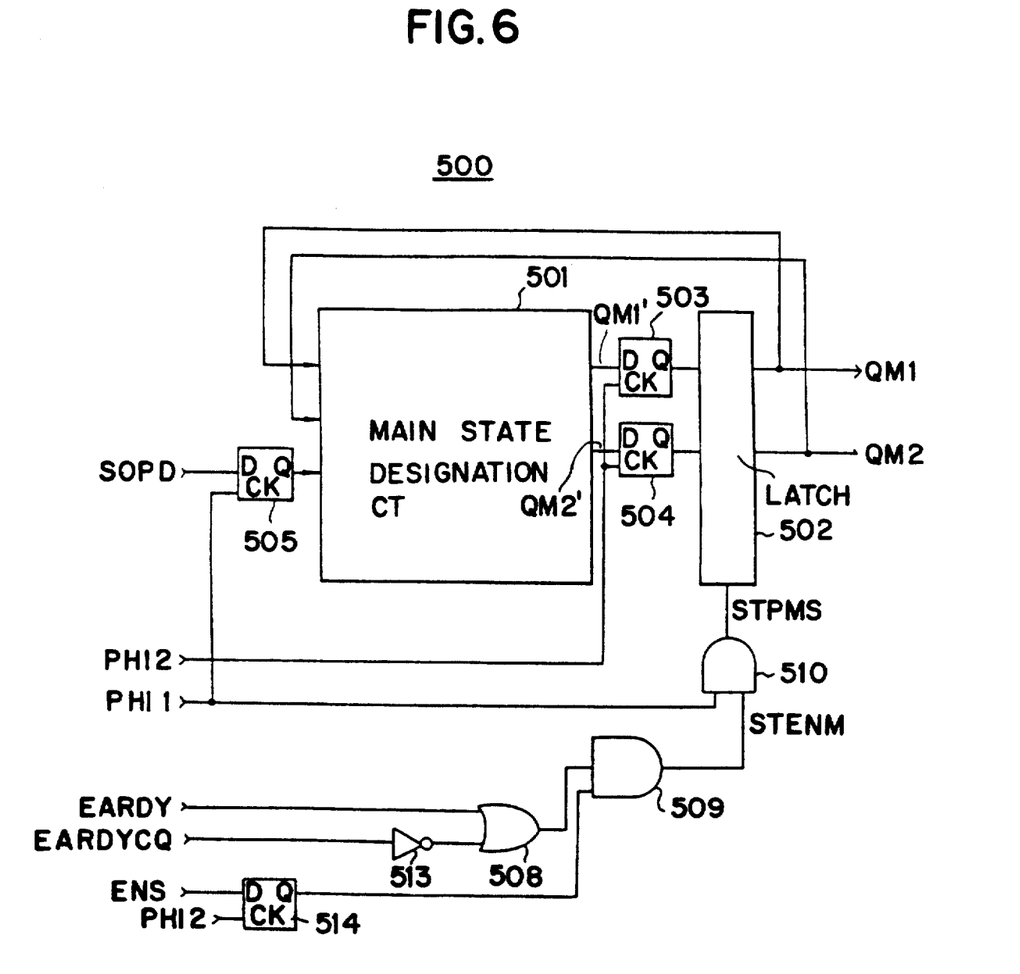
FIG. 6 is a circuit diagram representative of a main sequential control circuit according to another embodiment of the present invention.
Figure 7:
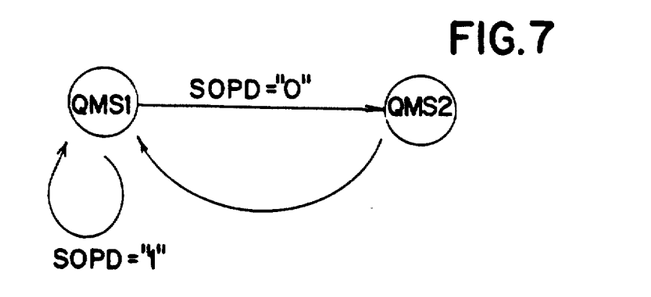
FIG. 7 is a state shifting diagram of the sequential control circuit shown in FIG. 6.

Turning to FIG. 6, the above-described main sequential control circuit employed in the sequence controller 1103 is denoted by the reference numeral 500 as another embodiment of the present invention. This control circuit 500 generates two main state signals QM1 and QM2 which designate operating states QMS1 and QMS2, respectively, as shown in FIG. 7. The state QMS1 controls the normal sequential control circuit 500 such that the circuit 500 performs the sequential control of a two-byte code. As long as the SPOD signal is at logic "1", the state QMS1 is designated. When the SOPD signal is changed to logic "0", the state QMS2 is designated to control the circuit 500 such that it performs the sequential control of a one-byte code.

Turning back to FIG. 6, the state signals QM1 and QM2 are supplied to a main state designation circuit 501 which also receives the output of D-FF 505 having a data input supplied with the SOPD signal and a clock input supplied with the first clock signal PHI1. The circuit 501 also comprises a PLA circuit and generates next state signals QM1' and QM2' in response to the current state signals QM1 and QM2 and the SOPD signal, as shown in TABLE-2 below.

TABLE 2

| Input | | Output |
|---|---|---|
| Current State | SOPD | Next State |
| QM1 | 1 | QM1' |
| QM1 | 0 | QM2' |
| QM2 | — | QM1' |

The state signals QM1' and QM2' are stored respectively in D-FFs 503 and 504 in synchronism with the leading edge of the second clock PHI2. The outputs of the D-FFs 503 and 504 are latched in a latch circuit 502 in response to the leading edge of a strobe signal STPMS. The output of the latch circuit 102 is outputted as the current state signal QM. The strobe signal STPMS is produced by an AND gate 510 having a first input supplied with the first clock PHI1 and a second input supplied with the output STENM of an AND gate 509. This gate 509 has a first input supplied with the output of D-FF 514 delaying the one-sequence end signal ENS from the normal sequential circuit 500 and a second input supplied with an output of the OR gate 508. The first input of the OR gate 508 is supplied with the EARDY signal from the EAG 1004 and the second input thereof is supplied with the EARDYCQ signal via an inverter 513.

Figure 8:
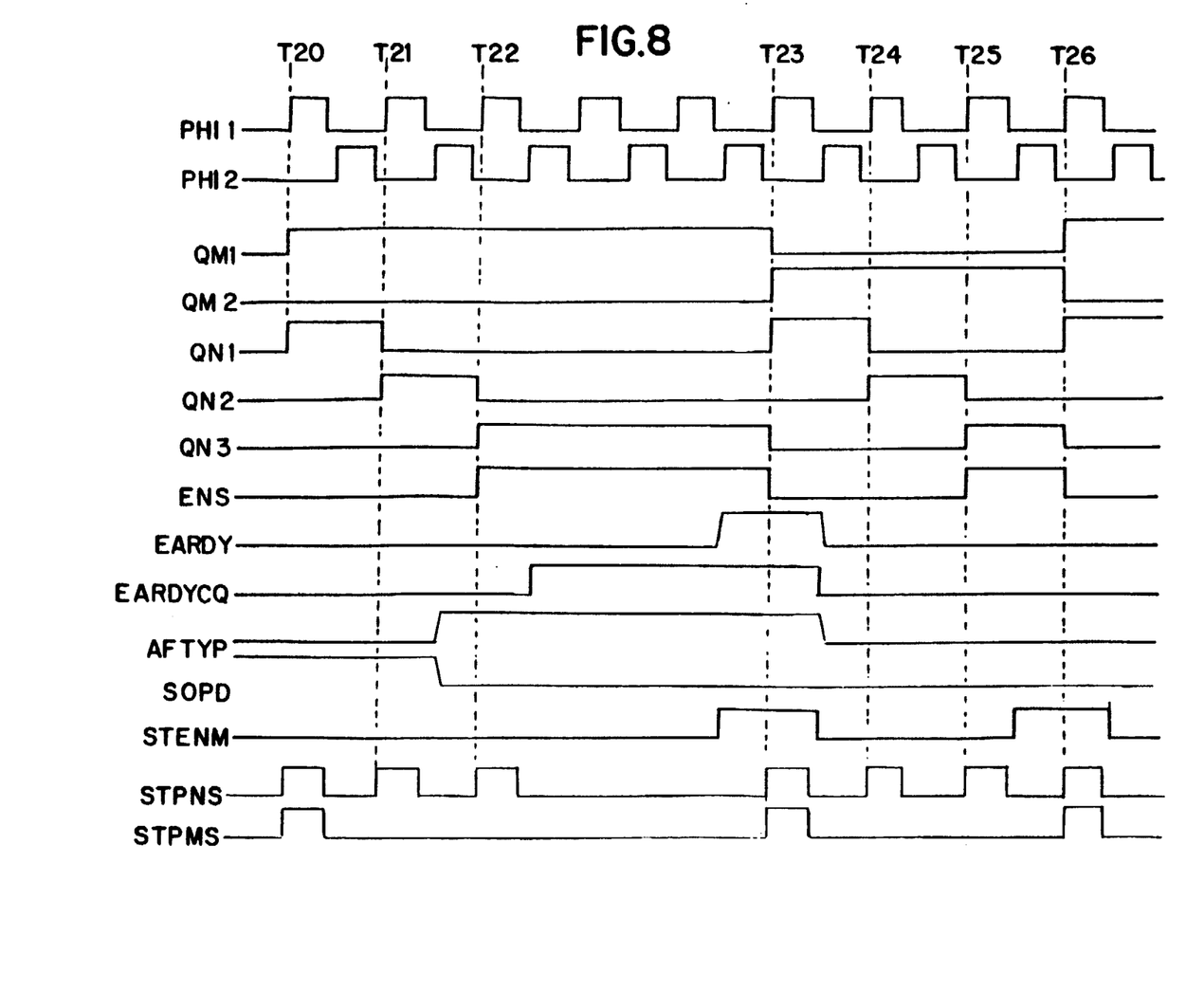
FIG. 8 is a timing chart representative of an operation of the sequential control circuits shown in FIGS. 3 and 6.

When the IDU 1003 is activated by power-on or the request from the EXU 1005, the latch circuit 502 is also preset to produce the state signal QM1 in synchronism with the leading edge of the first clock PHI1 at a time 20, as shown in FIG. 8. Accordingly, two state signals QM1 and QN1 are generated at the time $T_{20}$. In response to these signals QM1 and QN1, the IDU 1003 request two-byte code from the PFU 1002. The state QNS1 by the signal QN1 is continued until the IQRDY signal is returned from the PFU 1002, and thereafter the state signal QN2 is generated to designate the state QNS2 at a time $T_{21}$. In this state QNS2, the two-byte code is decoded by the decoders 1101 and 1102. Assuming that the instruction to be executed has two operand addressing fields 902 and 903 and the first operand addressing field 902 designates the base mode, the SOPD signal is changed to logic "0" and the AFTYP signal is changed to logic "1". In response to logic "1" of the AFTYP signal, the state QM3 is generated at a time $T_{22}$. On the other hand, the main state designation circuit 501 generates the state signal QM2', but this signal QM2' is not latched in the latch circuit 502 since the strobe signal STPMS is held at logic "0". In the state QN3, the IDU 1003 generates the STEA signal to request the address calculation from the EAG 1004 and waits for the EARDY signal. When the EARDY signal is returned to the IDU 1003, the OR gates 115 and 508 both produce logic "1". At this time, both the output of the OR gate 118 and the one-sequence end signal ENS are at logic "1", so that the strobe signals STPNS and STPMS are generated at a time $T_{23}$. As a result, the state signal QN1 is generated again and the state signal QM2 is generated in place of the signal QM2. In response to these signals QN1 and QM2, the IDU 1003 requests a one-byte code, i.e. the second operand addressing field 903, from the PFU 1002. The IDU 1003 waits for the IQRDY signal from the PFU 1002 in the state QNS1, and thereafter the state signal QN2 is generated at a time $T_{24}$. Assuming that the second operand addressing field 903 designates the register mode, the AFTYP signal is changed to logic "0", so that the EARDYCQ signal is changed to and held at logic "0". At a time $T_{25}$, the state QN3 starts. However, since the EARDYCQ signal is logic "0", the strobe signals STPNS and STPMS are generated at a time $T_{25}$. At this time, the main designation circuit 501 produces the state signal QM1' in response to the current state signal QM2. Therefore, the state signals QM1 and QN1 are produced at the time $T_{25}$.

In FIG. 6, in case a static type PLA circuit 501 is employed, the D-FFs 503 and 504 may be omitted.

The present invention is not limited to the above embodiments, but may be modified and changed without departing from the scope and spirit of the invention. The present invention also can be applied to a sequence controller used in a data processor other than a microprocessor.

What is claimed is:

1. A method of providing sequence control in an instruction decoder having a sequence controller for generating state designation data for designating a sequence of operating states, said state designation data being changed from first state designation data, having a first content for designating a current operating state, to second state designation data, having a second content for designating a next operating state, in response to a response signal generated by a unit operating in correspondence with said current operating state which supplies said response signal to said sequence controller, including the steps of:
   producing said first data designating a current operating state from a sequence controller in said instruction decoder;
   latching said first data to output said first data from said instruction decoder;
   producing said second data designating a next operating state from said sequence controller irrespective of reception of said response signal, corresponding to said current operating state, by said instruction decoder;
   producing a strobe in synchronism with a first clock signal supplied to said sequence controller when said response signal corresponding to said current operating state is received by said instruction decoder; and
   latching said second data to output said second data instead of said first data in response to said strobe.

2. A method is claimed in claim 1, further comprising the steps of:
   providing an additional clock signal having a phase opposite to that of said first clock signal; and
   temporarily storing said second data in response to said additional clock signal before said latching step of latching said second data.

3. A sequence controller for generating state designation data for designating a sequence of operating states, said state designation data being changed from first state designation data, having a first content for designating a current operating state, to second state designation data, having a second content for designating a next operating state, in response to a response signal generated by a unit operating in correspondence with said current operating state which supplies said response signal to said sequence controller, said sequence controller comprising:

(a) a set of terminals at which said sequence controller produces said first state designation data having said first content;
(b) means, coupled to said set of terminals and responsive to said first content of said first state designation data, for generating said second state designation data having said second content irrespective of said response signal being generated and supplied to said sequence controller;
(c) a latch circuit, coupled between said means for generating and said set of terminals and responsive to a strobe signal for latching and outputting said second state designation data having said second content for changing said state designation data at said set of terminals from said first content to said second content; and
(d) means, responsive to a first clock signal input to said sequence controller and to said response signal, for producing said strobe signal in synchronism with said first clock signal when said response signal is supplied to said sequence controller.

4. The controller as in claim 3, further comprising:
means, located between said means for generating and said latch circuit, for temporarily storing said second state designation data having said second content in response to a second clock signal, input to said sequence controller, having a phase opposite to a phase of said first clock signal.

5. A processor comprising:
(a) a first unit including
   (i) a sequence controller for producing first information for designating a first operating state of said first unit and second information for designating a second operating state of said first unit,
   (ii) first means, coupled to said sequence controller, for generating a request signal when said sequence controller produces said first information for designating said first operating state, and
   (iii) second means, coupled to said sequence controller, for performing a processing operation on data received by said second means when said sequence controller produces said second information for designating said second operating state; and
(b) a second unit, coupled to said first unit, including
   (i) third means, responsive to said request signal, for returning a response signal to said sequence controller, and
   (ii) fourth means for supplying said data to said second means;
(c) said sequence controller including
   (i) fifth means for temporarily latching said first information for designating said first operating state,
   (ii) sixth means, coupled to said fifth means, for responding to said first information for producing said second information irrespective of said response signal being returned,
   (iii) seventh means, coupled between said fifth means and said sixth means, for supplying said second information to said fifth means,
   (iv) eighth means responsive to return of said response signal for producing a strobe signal, and
   (v) ninth means, coupled between said fifth and eighth means, for supplying said strobe signal to said fifth means to cause said fifth means to latch said second information to cause said second means to start performing said processing operation on said data supplied to said second means from said fourth means of said second unit.

* * * * *